United States Patent [19]
Desormeaux

[11] Patent Number: 4,812,872
[45] Date of Patent: Mar. 14, 1989

[54] SMART FLASH CONTROL SYSTEM FOR CAMERAS

[75] Inventor: Stephen G. M. Desormeaux, Rochester, N.Y.

[73] Assignee: Eastman Kodak Company, Rochester, N.Y.

[21] Appl. No.: 143,417

[22] Filed: Jan. 13, 1988

[51] Int. Cl.$^4$ ............................................. G03B 15/03
[52] U.S. Cl. ...................................... 354/414; 354/419
[58] Field of Search .................................. 354/414, 419

[56] References Cited

U.S. PATENT DOCUMENTS

| | | | |
|---|---|---|---|
| 3,610,122 | 5/1971 | Biber | 95/10 |
| 3,667,357 | 6/1972 | Matsuda | 354/414 |
| 3,855,601 | 12/1974 | Uchiyama et al. | 354/414 |
| 4,023,187 | 5/1977 | Shenk | 354/27 |
| 4,063,257 | 12/1977 | Mashimo et al. | 354/414 |
| 4,074,287 | 2/1978 | Iwata et al. | 354/31 |
| 4,083,058 | 4/1978 | Iwata et al. | 354/128 |
| 4,159,870 | 7/1979 | Corey et al. | 354/414 |
| 4,174,161 | 11/1979 | Mashimo et al. | 354/414 |
| 4,291,959 | 9/1981 | Easterly | 354/31 |
| 4,317,620 | 3/1982 | Coppa et al. | 354/33 |
| 4,331,400 | 5/1982 | Brownstein et al. | 354/414 |
| 4,375,322 | 3/1983 | Coppa et al. | 354/27 |
| 4,429,969 | 2/1984 | Saegusa | 354/414 |
| 4,603,958 | 8/1986 | Maruyama et al. | 354/414 |

*Primary Examiner*—Russell E. Adams
*Attorney, Agent, or Firm*—Roger A. Fields

[57] ABSTRACT

An artificial illumination control system for controlling the energization of an electronic flash device during a photographic exposure interval in a camera has three flash related modes of operation, full flash, no flash, and fill flash, one of which is automatically selected in accordance with the level of ambient light intensity each time the exposure interval is commenced.

5 Claims, 5 Drawing Sheets

LOOK UP TABLE MEMORY

| AMBIENT LIGHT LEVEL | FLASH TIMER LIMIT | EXPOSURE INTERVEL TIMER LIMIT |
|---|---|---|
| ≤ 64 f.-l. | $T_2$ | $T_4$ |
| > 64 f.-l. < 500 f.-l. | — | $T_5$ |
| ≥ 500 f.-l. | $T_1$ | $T_3$ |

SMART FLASH CONTROL SYSTEM FOR CAMERAS

CROSS-REFERENCE TO A RELATED APPLICATION

Reference is made to commonly assigned, copending U.S. patent application Ser. No. 143,418, filed Jan. 13, 1988 in the name of Stephen G. Malloy Desormeaux and entitled FILL FLASH CONTROL SYSTEM FOR CAMERAS.

BACKGROUND OF THE INVENTION

1. Field of the Invention

The invention relates generally to the field of photography, and specifically to an artificial illumination control system for a camera. More particularly, the invention relates to an artificial illumination control system for controlling the energization of a source of artificial illumination in a normal (or full) flash mode of operation, where ambient light levels are too low for a proper exposure, and in a fill (or fill-in) flash mode of operation, where ambient light levels are relatively high but certain portions of the subject to be photographed have significantly less light falling on them than surrounding portions of the subject.

2. Description of the Prior Art

When taking a picture under conditions at which the levels of ambient light intensity are relatively high, such as in bright sun, but certain portions of the subject to be photographed have significantly less light falling on them than surrounding portions of the subject, resulting in the formation of dark shadows on the subject, it is desirable to provide additional scene illumination from a source of artificial illumination, such as an electronic flash device, sometimes referred to as a "strobe" unit. Situations where a source of artificial illumination are used in relatively high ambient light levels are commonly referred to as a "fill" or "fill-in" mode of flash operation.

Cameras were recently introduced several years ago, for example the KODAK MEDALIST VR 35 Camera, manufactured by Eastman Kodak Company, Rochester, N.Y., which include a manually operated fill-flash switch. The fill-flash switch must be manually closed to provide a fill flash mode of operation for a built-in electronic flash unit, and it must be held closed at the same time the shutter release button is depressed to initiate the photographic exposure interval. Conversely, in the normal flash mode of operation for use in dimly lighted surroundings, the electronic flash unit is automatically energized.

Other known cameras operate an electronic flash unit either in a normal flash mode or in a fill flash mode each time a picture is taken. Typically, in these cameras, the flash output is varied in accordance with the ambient light level.

SUMMARY OF THE INVENTION

According to the invention, there has been devised a "smart" flash control system for cameras.

More particularly, there has been devised an improved flash control system for controlling the energization of an electronic flash device during a photographic exposure interval in a camera, wherein (a) light level detecting means provides a measure of the level of ambient light intensity and (b) flash triggering means for energizing said electronic flash device is operated in a full flash mode to enable a full flash exposure and is operated in a fill flash mode to enable a fill flash exposure, and wherein the improvement comprises:

comparator means for determining whether the measure of the level of ambient light intensity provided by said light level detecting means is less than or equal to a first value, is greater than the first value but less than a second value, or is equal to or greater than the second value; and control means, acting subsequent to said comparator means determining that said measure of the level of ambient light intensity is less than or equal to the first value, for operating said flash triggering means in its full flash mode, acting subsequent to said comparator means determining that said measure of the level of ambient light intensity is greater than the first value but less than the second value, for preventing operation of said flash triggering means, and acting subsequent to said comparator means determining that said measure of the level of ambient light intensity is equal to or greater than the second value, for operating said flash triggering means in its fill flash mode, whereby a full flash exposure or a non-flash exposure or a fill flash exposure will automatically be selected in accordance with the level of ambient light intensity.

THE CROSS-REFERENCED APPLICATION

The application cross-reference above discloses a "smart" flash control system for controlling the energization of an electronic flash device during a photographic exposure interval in a camera, wherein there exists three flash related modes of operation, full flash, no flash, and fill flash, one of which is automatically selected in accordance with the level of ambient light intensity. If, however, the level of ambient light intensity warrants the fill flash mode, but the camera-to-subject distance exceeds a predetermined distance beyond which the flash output may be ineffectual for a fill flash exposure, the fill flash mode is prevented and the control system reverts to its no flash mode.

DETAILED DESCRIPTION OF THE PREFERRED EMBODIMENT

The invention is disclosed as being embodied preferably in a conventional 35 mm camera having a built-in electronic flash unit. Because such a camera is well known, this description is directed in particular to photographic elements forming part of or cooperating directly with the disclosed embodiment. It is to be understood, however, that other elements not specifically shown or described may take various forms known to persons of ordinary skill in the art.

Figure 1:
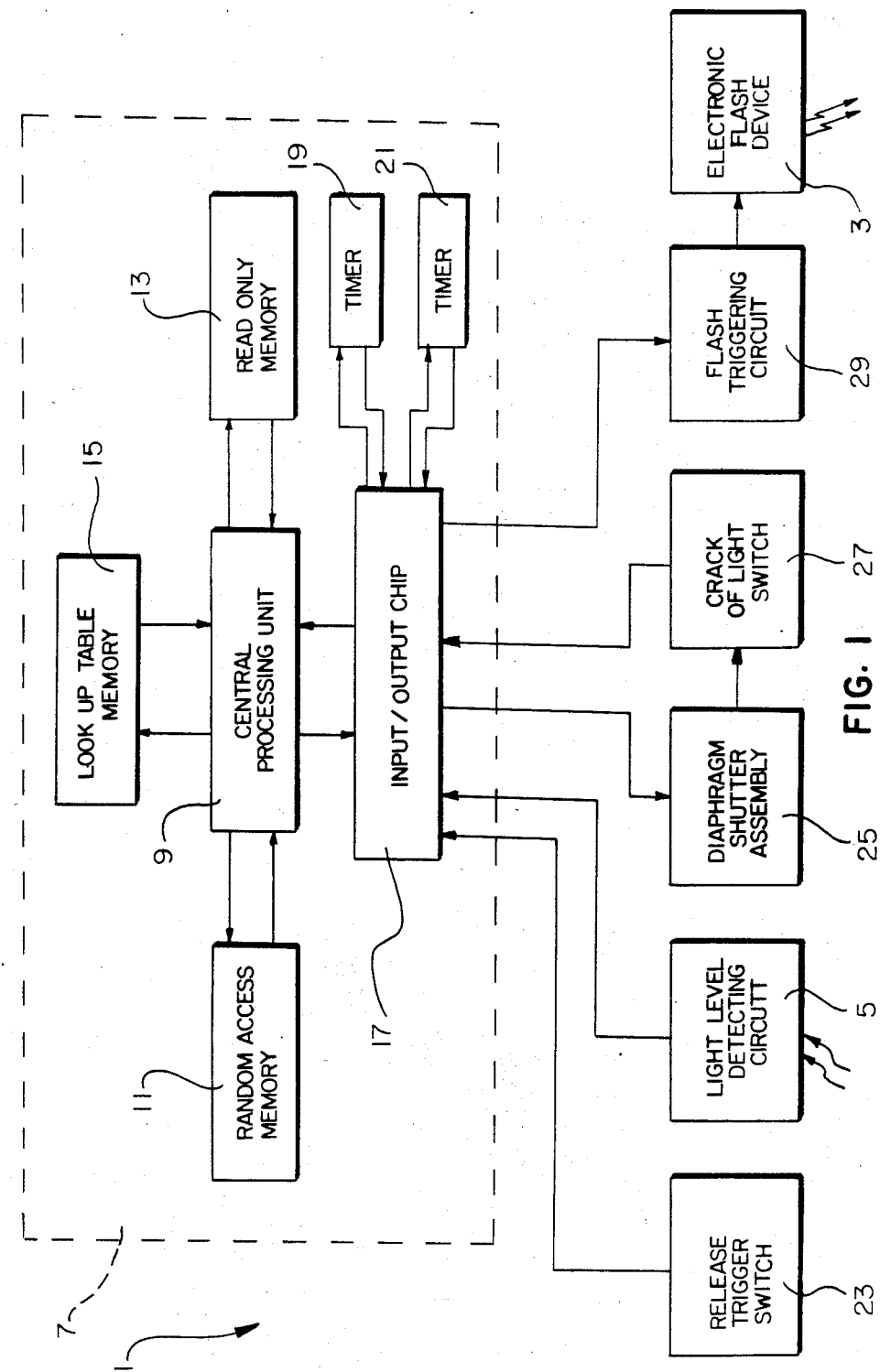
FIG. 1 is a block diagram of a smart flash control system for a camera according to a preferred embodiment of the invention.

Referring now to the drawings, FIG. 1 depicts a smart flash control system 1 for controlling the energization of a conventional electronic flash device 3 during a photograhic exposure interval in a 35 mm camera. According to the invention, the control system 1 has three flash related modes of operation, full (or normal) flash, no flash, and fill (or fill-in) flash, one of which is automatically selected, each time the exposure interval is commenced, in accordance with a measure of the level of ambient light intensity provided by a conventional light level detecting circuit 5.

As shown in FIG. 1, the control system 1 includes, in addition to the electronic flash device 3 and the light level detecting circuit 5, a conventional microcomputer 7 having a microprocessor or central processing unit (CPU) 9, a volatile random access memory (RAM) 11, a non-volatile read-only memory (ROM) 13, a look-up table memory 15, an input/output (I/O) chip 17, a flash timer 19, and an exposure interval timer 21. Moreover, a normally open release trigger switch 23 is shown which is closed in response to manually depressing a shutter release button, not shown, on the body of the camera. A conventional diaphragm shutter assembly 25 is shown which is opened to commence the exposure interval and closed to terminate the exposure interval in response to its receipt of respective control signals from the microcomputer 7. A normally open "crack of light" switch 27 is shown which is closed each time the diaphragm shutter assembly 25 is initially opened. A conventional flash triggering circuit 29 for energizing the electronic flash device 3 is shown which is operated by the microcomputer 7 in a full flash mode to enable a ful flash exposure and is operated in a fill flash mode to enable a fill flash exposure.

Figure 2:
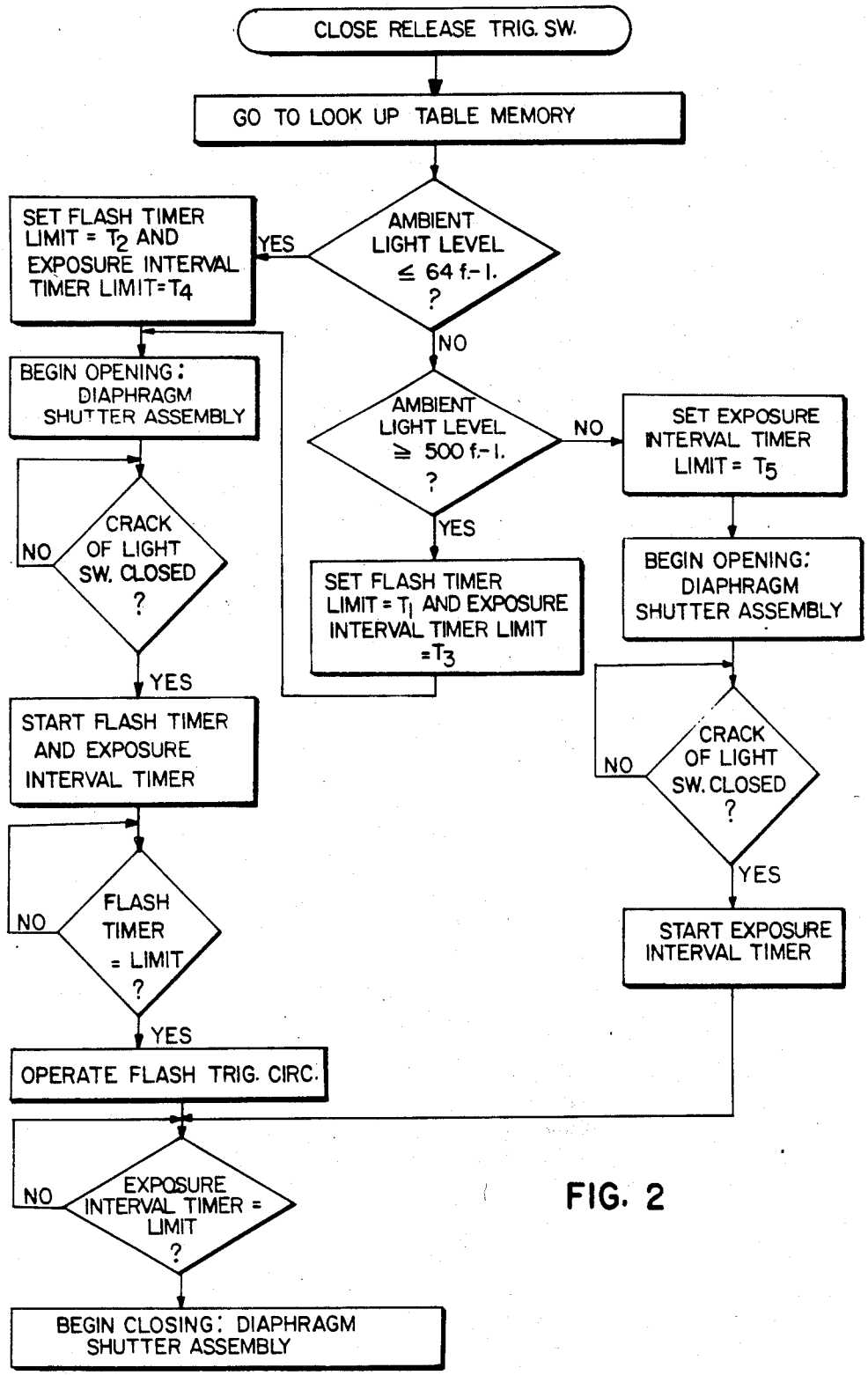
FIG. 2 is a microcomputer flow chart depicting the various steps of operation of the smart flash control system.
Figure 2A:
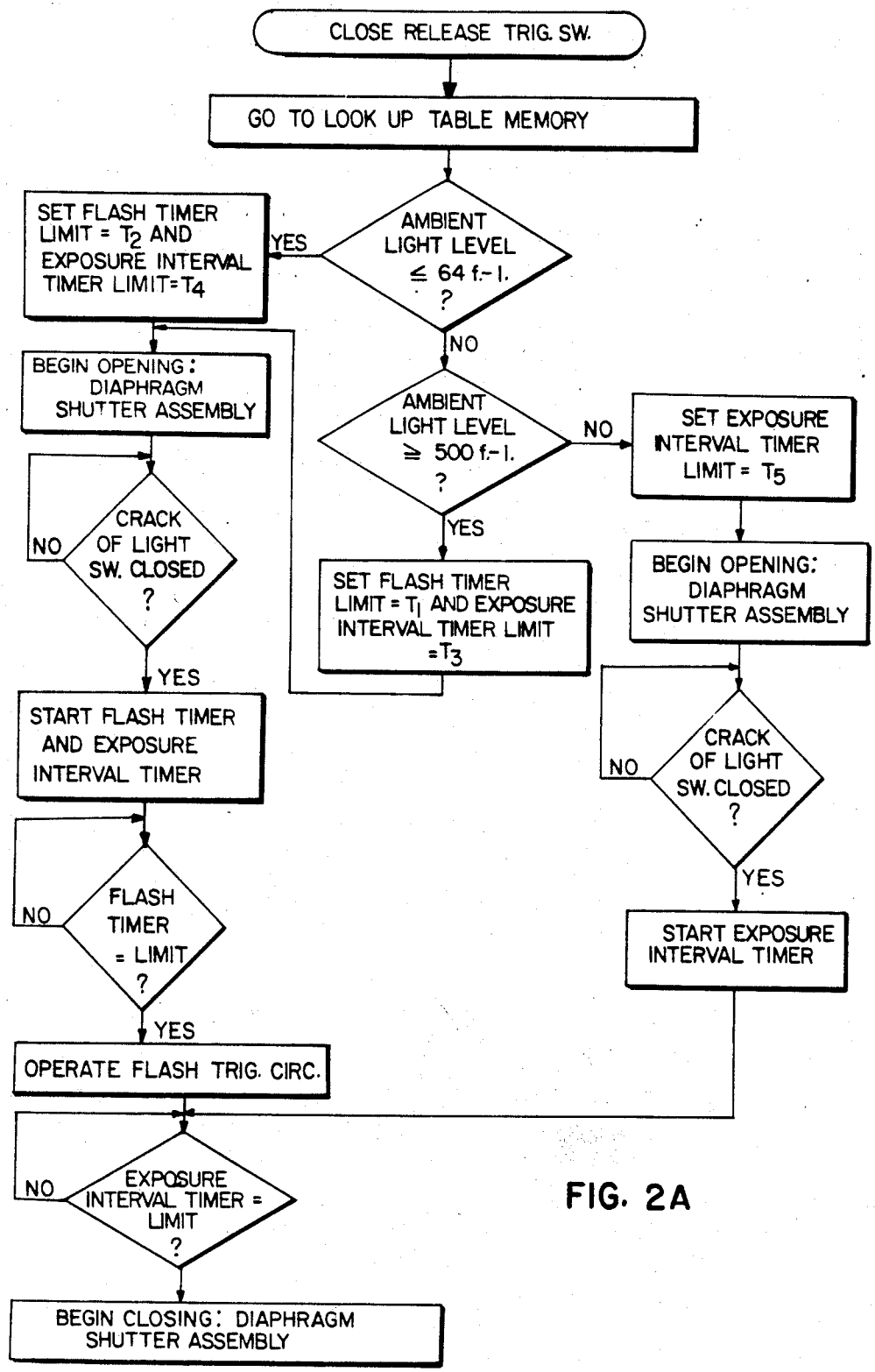

FIG. 2 is a flow chart for the microcomputer 7, depicting the various steps of operation of the flash control system 1. When the release trigger switch 23 is closed in response to manual depression of the shutter release button, the microcomputer 7 interrogates its look-up table memory 15 to determine whether the measure of the level of ambient light intensity provided by the light level detecting circuit 5 either is less than or equal to 64 foot-lamberts, which is too low for a proper exposure, is greater than 64 foot-lamberts but less than 500 foot-lamberts, or is equal to or greater than 500 foot-lamberts, which is relatively bright. Following this determination, one of the three flash related modes, full flash, no flash, or fill flash is automatically selected.

(a) Full Flash Mode Steps

Figure 5:
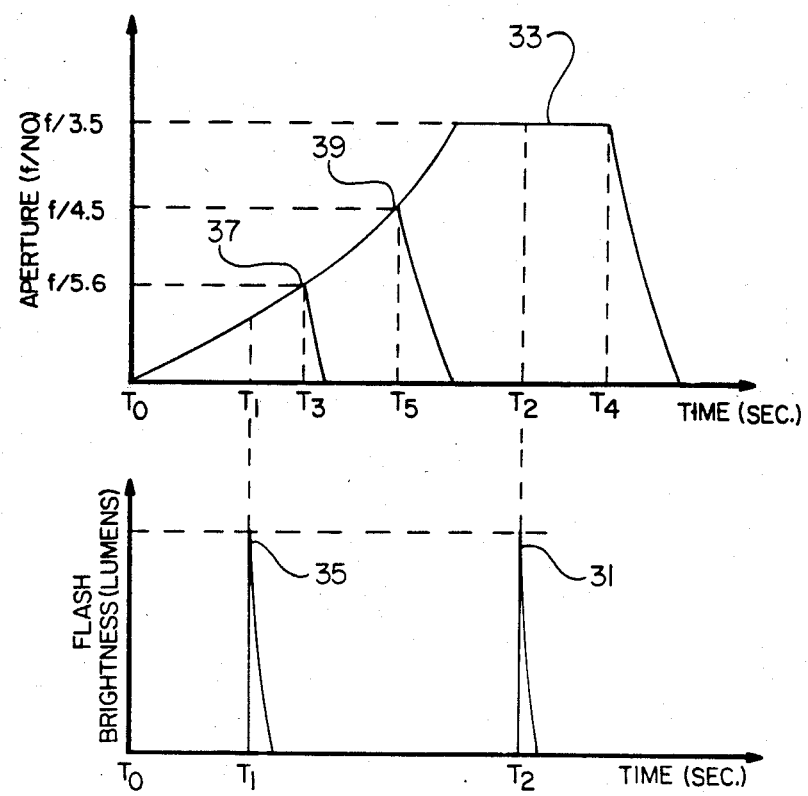
FIG. 5 is a graph-like chart comparing the exposure interval and the flash or no flash interval in each of the three modes of operation of the flash control system.

1. If, as shown in the flow chart of FIG. 2 and the look-up table of FIG. 3, the measure of the level of ambient light intensity provided by the light level detecting circuit 5 is less than or equal to 64 foot-lamberts, the limit or duration of the flash timer 19 is set to $T_2$ seconds and the limit or duration of the exposure interval timer 21 is set to $T_4$ seconds. $T_4$ seconds is longer in duration than $T_2$ seconds—see FIG. 5.
2. Then, as shown in the flow chart of FIG. 2, the microcomputer 7 issues a control signal to begin opening of the diaphragm shutter assembly 25, to commence the exposure interval. The exposure interval begins at $T_0$ seconds, as shown in FIG. 5.
3. Initial opening of the diaphragm shutter assembly 25 closes the crack of light switch 27 via a suitable known mechanism, not shown.
4. Closure of the crack of light switch 27 instructs the microcomputer 7 to simultaneously start the flash timer 19 and the exposure interval timer 21 at $T_0$ seconds.
5. When the flash timer 19 reaches the limit to which it has been set, in this instance $T_2$ seconds, the microcomputer 7 issues a control signal that operates the flash triggering circuit 29 to energize the electronic flash device 3. As shown in FIG. 5, the resulting flash discharge at $T_2$ seconds is typical. That is, it is very brief and intense, with virtually no firing delay. In FIG. 5, the area under the "spike" 31 represents the full flash output in lumen-seconds.
6. When the exposure interval timer 21 reaches the limit to which it has been set, in this instance $T_4$ seconds, the microcomputer 7 issues a control signal to begin closing of the diaphragm shutter assembly 25, to terminate the exposure interval. In FIG. 5, the area under the largest curve 33 represents the exposure interval for a full flash exposure.

(b) Fill Flash Mode Steps

Figures 3, 4:
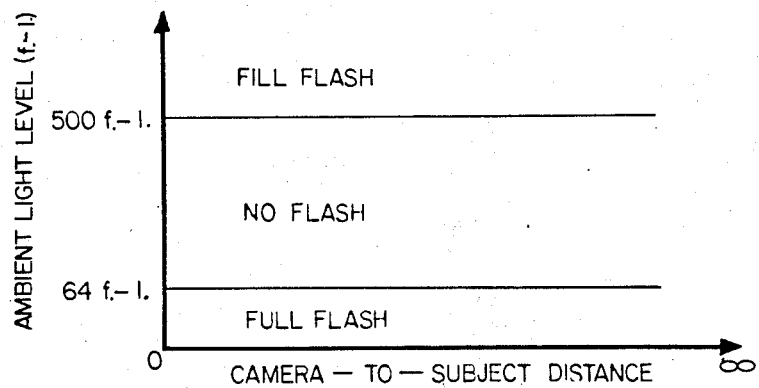
FIG. 3 is a schematic diagram of the contents of a non-volatile look-up table memory included in the smart flash control system.
FIG. 4 is a schematic diagram depicting three flash related modes of operation, fill flash, no flash, and fill flash, of the flash control system.

1. If, as shown in FIGS. 2 and 3, the measure of the level of ambient light intensity provided by the light level detecting circuit 5 is equal to or greater than 500 foot-lamberts, the limit or duration of the flash timer 19 is set to $T_1$ seconds and the limit or duration of the exposure interval timer 21 is set to $T_3$ seconds. $T_3$ seconds is longer in duration than $T_1$ seconds (and each of these times is shorter in duration than $T_2$ seconds or $T_4$ seconds)—see FIG. 5.
2. Then, as shown in FIG. 2, the microcomputer 7 issues the control signal to begin opening of the diaphragm shutter assembly 25, to commence the exposure interval. The exposure interval begins at $T_0$ seconds, as shown in FIG. 5.
3. Initial opening of the diaphragm shutter assembly 25 closes the crack of light switch 27.
4. Closure of the crack of light switch 27 instructs the microcomputer 7 to simultaneously start the flash timer 19 and the exposure timer 21 at $T_0$ seconds.
5. When the flash timer 19 reaches the limit to which it has been set, in this instance $T_1$ seconds, the microcomputer 7 issues the control signal that operates the flash triggering circuit 29 to energize the electronic flash device 3. As shown in FIG. 5, the resulting flash discharge at $T_1$ seconds yields a fill flash output represented by the area under the spike 35. Note that the fill flash output 35 and the full flash output 31 in FIG. 5 are identical; that is, they have the same peak intensity and the same duration. The only difference between the two flash outputs is the time of introduction, $T_1$ or $T_2$.
6. When the exposure interval timer 21 reaches the limit to which it has been set, in this instance $T_3$ seconds, the microcomputer 7 issues the control signal to begin closing of the diaphragm shutter assembly 25, to terminate the exposure interval. In FIG. 5, the area under the smallest curve 37 represents the exposure interval for a fill flash exposure.

(c) No Flash Mode Steps

1. If, as shown in FIGS. 2 and 3, the measure of the level of ambient light intensity provided by the light level detecting circuit 5 is greater than 64 foot-lamberts but less than 500 foot-lamberts, the limit or duration of the exposure interval timer 21 is set for $T_5$ seconds (no limit or duration is set for the flash timer 19). $T_5$ seconds is between $T_3$ seconds and $T_4$ seconds as to duration—see FIG. 5.

2. Then, as shown in FIG. 2, the microcomputer 7 issues the control signal to begin opening of the diaphragm shutter assembly 25, to commence the exposure interval. The exposure interval begins at $T_0$ seconds, as shown in FIG. 5.
3. Initial opening of the diaphragm shutter assembly 25 closes the crack of light switch 27.
4. Closure of the crack of light switch 27 instructs the microcomputer to start the exposure interval timer 21 (but not the flash timer 19) at $T_0$ seconds.
5. When the exposure interval timer 21 reaches the limit to which it has been set, in this instance $T_5$ seconds, the microcomputer 7 issues the control signal to begin closing of the diaphragm shutter assembly 25, to terminate the exposure interval. In FIG. 5, the area under the midsize curve 39 represents the exposure interval for an ambient light (no flash) exposure.

Accordingly, with the control system 1 either a full flash exposure, a fill flash exposure, or a no flash exposure will automatically be selected in accordance with the level of ambient light intensity each time an exposure interval is commenced. This is illustrated in schematic fashion in FIGS. 4 and 5.

OPERATION

The control system 1 operates selectively in one of three flash related modes based upon ambient light levels. Specifically, it operates in a fill flash mode whenever the ambient light level is equal to or greater than a predetermined high or bright level, providing the same flash output in all cases of bright light. It operates in a full flash mode whenever the ambient light level is less than or equal to a predetermined low or dim level, providing the same output in this mode as in the fill flash mode. If, however, the ambient light level falls somewhere between the predetermined high and low levels, the control system is operated in a no flash mode where no artificial illumination is provided.

The invention has been described with reference to a preferred embodiment. However, it will be appreciated that variations and modifications can be effected within the ordinary skill in the art without departing from the scope of the invention. For example in the preferred embodiment, the three exposure interval curves 33, 37, and 39 relating to a full flash exposure, a fill flash exposure, and a no flash exposure assume a film speed of ASA 100. With other film speeds, the curves of course would be somewhat different as to aperture and/or as to the closing times $T_4$, $T_3$, and $T_5$. Also, the flash output spikes 31 and 35 for full flash and fill flash might be somewhat different as to the times $T_2$ and $T_1$.

In the preferred embodiment, the exposure interval curves 33, 37, and 39 are limited to three in number. However, it will be appreciated that this number can be increased. Also, the control system can be made more sophisticated simply by increasing the number of light level zones in the look-up table memory 15.

I claim:

1. An improved artificial illumination control system for controlling the energization of an electronic flash device during a photographic exposure interval in a camera, wherein (a) light level detecting means provides a measure of the level of ambient light intensity and (b) flash triggering means for energizing said electronic flash device is operated in a full flash mode to enable a full flash exposure and is operated in a fill flash mode to enable a fill flash exposure, and wherein the improvement comprises:

comparator means for determining whether the measure of level of ambient light intensity provided by said light level detecting means is less than or equal to a first general brightness level which is too low for a proper daylight exposure, is greater than the first general brightness level but less than a second general brightness level which is substantially high as in bright sun, or is equal to or greater than the second general brightness level; and control means, acting subsequent to said comparator means determining that said measure of the level of ambient light intensity is less than or equal to the first general brightness level, for operating said flash triggering means in its full flash mode, acting subsequent to said comparator means determining that said measure of the level of ambient light intensity is greater than the first general brightness level but less than the second general brightness level, for preventing operation of said flash triggering means, and acting subsequent to said comparator means determining that said measure of the level of ambient light intensity is equal to or greater than the second general brightness level, for operating said flash triggering means in its fill flash mode, whereby a full flash exposure or a non-flash exposure or a fill flash exposure will automatically be selected in accordance with either one or two general brightness levels.

2. The improvement as recited in claim 1, wherein said electronic flash device provides the same flash output in lumen-seconds whether said flash triggering means is operated in its full flash mode or its fill flash mode.

3. The improvement as recited in claim 2, wherein said control means includes a timer for determining whether either one of two successive spaced times $T_1$ and $T_2$ have elapsed following the commencement of said photographic exposure interval, said control means operating said flash triggering means in its full flash mode whenever said measure of the level of ambient light intensity is less than or equal to said first general brightness level and $T_2$ has elapsed and operating the flash triggering means in its fill flash mode whenever said measure of the level of ambient light is equal to or greater than said second general brightness level and $T_1$ has elapsed, but not operating said flash triggering means any time between $T_1$ and $T_2$.

4. An improved artificial illumination control system for controlling the energization of an electronic flash device during a photographic exposure interval in a camera, wherein there exists only three modes of operation, full flash, no flash, and fill flash, and wherein the improvement comprises:

automatic means for automatically selecting one of said three modes in accordance with either one or two general brightness levels, one too low for a proper daylight exposure and the other substantially high as in bright sun, each time an exposure interval is initiated.

5. The improvement as recited in claim 5, wherein said electronic flash device provides the same flash output in lumen-seconds whether said full flash mode or said fill flash mode is selected.

* * * * *

UNITED STATES PATENT OFFICE
CERTIFICATE OF CORRECTION

PATENT NO. : 4,812,872
DATED : March 14, 1989
INVENTOR(S) : S. G. MALLOY DESORMEAUX It is certified that error appears in the above-identified patent and that said Letters Patent is hereby corrected as shown below:

No. 75, Front Page, Inventor's Name should read --Stephen G. MALLOY DESORMEAUX--.

Col. 3, Line 35, "ful" should read --full--.

Col. 2, Line 54, "and fill" should read --and full--.

Col. 6, Line 63, "claim 5" should read --claim 4--.

Signed and Sealed this

Thirty-first Day of October, 1989

Attest:

DONALD J. QUIGG

Attesting Officer    Commissioner of Patents and Trademarks